United States Patent [19]
Gaydecki

[11] 3,830,483
[45] Aug. 20, 1974

[54] SPRINGS
[75] Inventor: Jan Gaydecki, Leicester, England
[73] Assignee: Dunlop Limited, London, England
[22] Filed: Sept. 20, 1972
[21] Appl. No.: 290,505

[30] Foreign Application Priority Data
Sept. 22, 1971 Great Britain.................. 44414/71

[52] U.S. Cl............................................. 267/63 A
[51] Int. Cl............................................. F16f 1/36
[58] Field of Search............... 267/153, 63 R, 63 A; 213/40; 105/224.1

[56] References Cited
UNITED STATES PATENTS
2,802,662  8/1957  Hirst............................ 267/63 A X
3,493,221  2/1970  Mozdzanowski................. 267/63 R
3,626,465  12/1971  Hirst.............................. 105/244.1
3,684,271  8/1972  Arthur......................... 267/63 R X
3,731,913  5/1973  Hirst............................... 267/63 R

*Primary Examiner*—Robert G. Sheridan
*Attorney, Agent, or Firm*—Stevens, Davis, Miller & Mosher

[57] ABSTRACT

A chevron spring comprising two angled metal plates of V-shaped cross-section and an intermediate elastomeric element of substantially rectangular shape from which at least the corner portions are absent, of which the following is a specification.

13 Claims, 8 Drawing Figures

SPRINGS

This invention relates to springs and in particular to springs of the chevron type. Such springs comprise one or more rectangular elements of elastomeric materials interleaved between and bonded to angled metal plates.

Springs of this type are prone to failure due to stress concentration at the center portion of each of the outer edges of the rectangular elastomeric elements. Furthermore, fatigue failures of the interleaving angled metal plates occur at the apices of the plates, and particularly at the ends of each apex where high bending moments may occur.

One object of the present invention is to provide an improved chevron spring, and another object of the present invention is to provide an improved suspension system incorporating chevron springs in accordance with the present invention.

According to one aspect of the present invention a chevron spring comprises two angled plates of V-shaped cross-section and an elastomeric element located therebetween and bonded thereto, wherein the outer profile of the elastomeric element, in at least any regions of the element furthest from the center of the element, is such that the area bounded by the outer profile of the elements is less than the product of the length and breadth of each of said bonded faces.

According to another aspect of the present invention the width of the element in the vicinity of the apex of one of the angled plates is greater than the width of the element at a portion of the element furthest from the apex of said plate.

Preferably each elastomeric element is symmetrical about a plane containing the apex line of one of the V-shaped plates, in a direction bisecting the apex angle. Additionally or alternatively each elastomeric element may be symmetrical about a plane perpendicular to the apex line of one of the V-shaped plates.

Each elastomeric element may have a polygonal outer profile or it may have an outer profile at least part of which is curved. In the case of an element which is of a polygonal shape it may be of an essentially rectangular shape, but formed between any two perpendicular edges with one or more edges extending obliquely relative to said perpendicular edges; alternatively, it may be of a substantially diamond-shape profile. In the case of an element which is curved over at least part of its outer periphery, it may be of an elliptical form or of a circular form.

As an alternative, each elastomeric element may be formed with a profile which comprises both straight and curved portions.

The invention relates not only to chevron springs comprising only two metal plates having a single elastomeric element bonded therebetween, but also to chevron springs comprising a plurality of angled metal plates having interleaved therebetween and bonded thereto a plurality of elastomeric elements. While such a spring may include only one elastomeric element in accordance with the present invention, each of the elements may be identical and each be formed with the profile of an element of a chevron spring in accordance with the present invention. Each elastomeric element may be formed of rubber.

In a chevron spring in accordance with the present invention the metal plates need not necessarily be of rectangular shape; they may, for example, conform substantially to the profile of the elastomeric element.

The outer profile of the elastomeric elements is intended to result in a more even distribution of strain around the periphery of the element as compared with conventional chevron springs. A conventional chevron spring comprises a plurality of rubber elements interleaved between and bonded to angled rectangular metal plates. The end plates are usually attached one to a supported surface and the other to a supporting surface and in operation of the spring, as it allows relative movement between its ends, the rubber elements may be subjected to compression, tensile and shearing forces.

In particular, when such a spring is subjected to compressive load, the outer edge surfaces of the rectangular rubber element or elements bulge. However, the center portions of each edge bulge more than the corner regions due to the restraining effect of the rubber in the corners. This effect is caused by the greater distance of the corners from the center of the element, and the consequently greater volume of rubber which resists and withstands the hydrostatic pressure.

Since, however, in addition to compressive load the spring is usually subjected also to shear loading, for example as in the case of a chevron spring used in a vehicle suspension, the shear strains in the rubber elements due to the shear deflection will combine with the shear strains caused by the compression bulging of the rubber. Maximum strains due to the latter will occur on the two bonded surfaces of the rubber element and are additive to the shear deflection strain, and it is the occurrence of these maximum strains which usually limit the load capability of a conventional chevron spring.

By contrast, when a chevron spring in accordance with the present invention is subjected to compressive loads the bulging at the edges of the rubber elements, as a result of the shearing, compressive, and tensile strains, is distributed more evenly around the periphery of the element and the stress concentrations at the central and apex regions of the edges are reduced. This results from each portion of the edge of the element being more nearly the same distance from the center of the element than as in the case of a conventional rectangular element. Thus in practice more effective use is made of the particular volume of rubber in each element.

Several embodiments of the invention will now be described, by way of example, with reference to the accompanying drawings in which.

Figure 1:
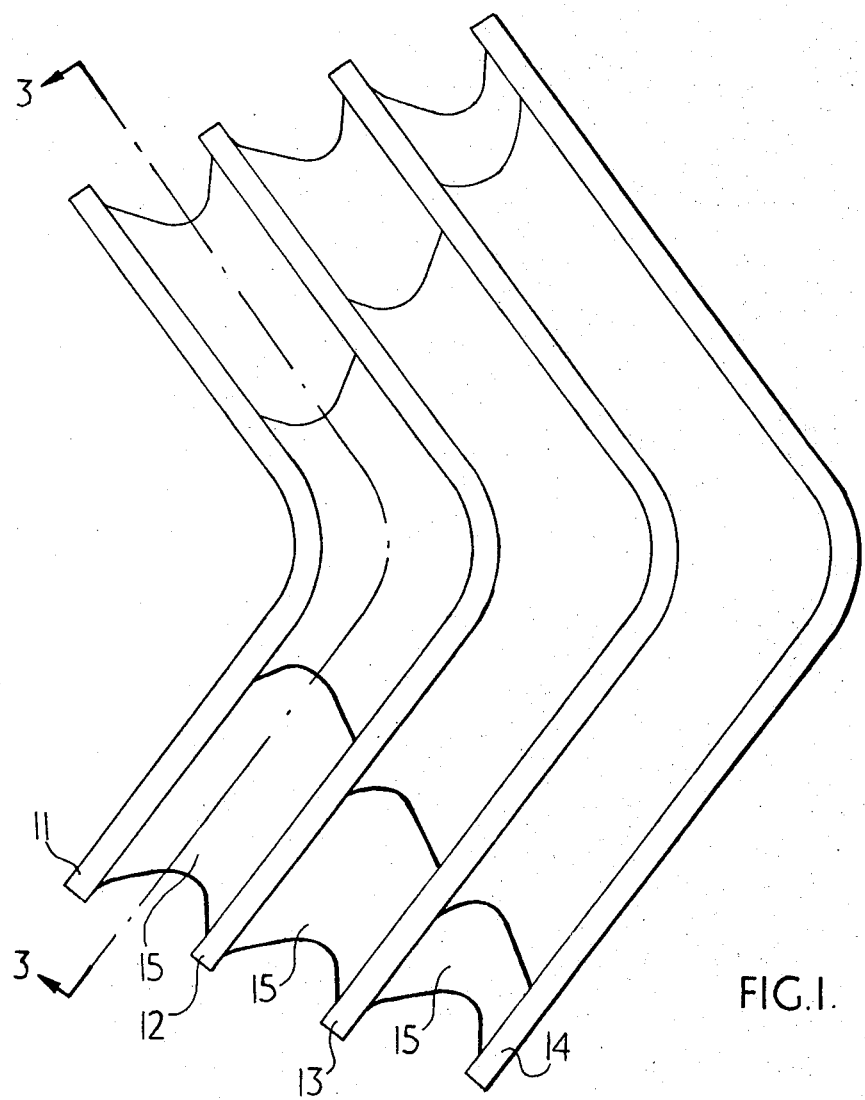
FIG. 1 is an end view of a chevron spring in accordance with the present invention.
Figure 2:
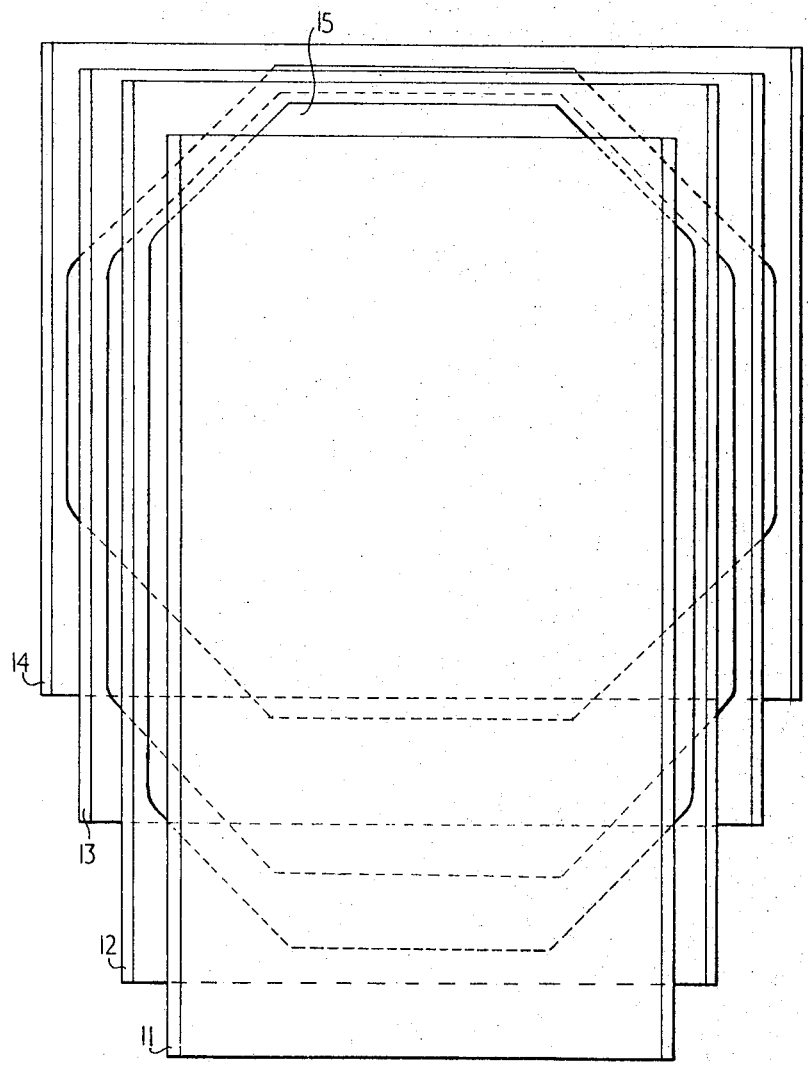
FIG. 2 is a plan view of the spring shown in FIG. 1.
Figure 3:
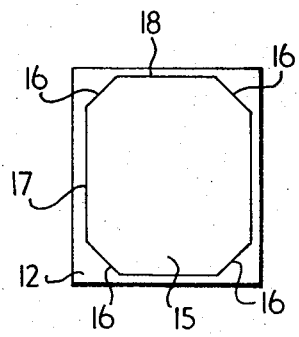
FIG. 3 is a sectional view on the line 3—3 of FIG. 1.

In a first embodiment of the invention, illustrated in FIGS. 1 to 3, a chevron spring comprises four angled metal plates, 11 to 14, of V-shaped cross-sectional form and three rubber elements 15 interleaved between the four metal plates. End plates 11 and 14 enable the spring to be secured respectively to a supporting and a supported surface. As illustrated specifically by FIG. 3 each rubber element 15 is a substantially rectangular shape except that the corner portions of an imaginary rectangle containing the element are removed so as to form an element having eight edges, that is including four edge portions 16 which are oblique to the perpendicular sides of the element 17, 18.

Figure 4:
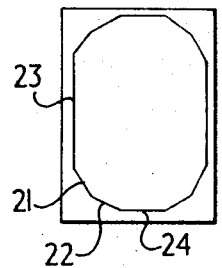
FIGS. 4 to 7 are sectional views similar to that of FIG. 3 of the rubber elements of other chevron springs in accordance with the present invention.

In a second embodiment of the invention, illustrated in FIG. 4, a rubber element 20 is formed with twelve edges, there being at each corner of the element two edges 21, 22 extending obliquely relative to each other and to the perpendicular sides 23, 24 of the element.

Figure 5:
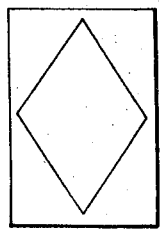
Figure 6:
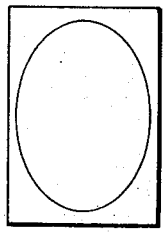

In other embodiments of the invention the rubber element may be of a diamond-shaped profile as illustrated in FIG. 5, or it may be of an elliptical profile as illustrated in FIG. 6, or it may be of a circular profile (not illustrated).

Figure 7:
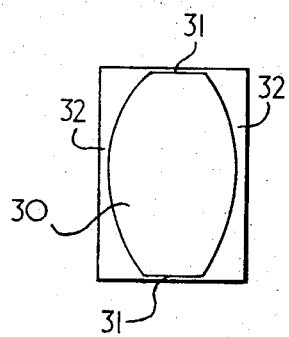

In a further embodiment of the invention illustrated in FIG. 7, a rubber element 30 is of a substantially rectangular shape having straight ends 31 but being curved along each of its longer sides 32 such that it is wider at its central portion than at each end.

Figure 8:
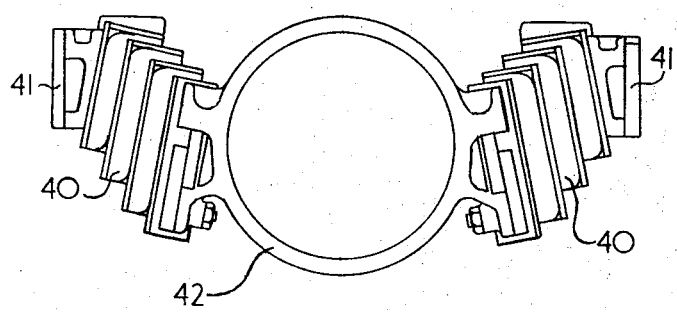
FIG. 8 is a side elevation of a suspension system comprising a chevron spring in accordance with the present invention.

FIG. 8 shows a side elevation of a railway vehicle suspension system in which two sets of springs 40 in accordance with the present invention resiliently connect a vehicle body 41 with a wheel axle box 42.

While the invention has been described with reference to chevron springs in which the rubber elements are of a symmetrical shape, it is to be appreciated that the invention applies equally to chevron springs in which elastomeric elements are of non-symmetrical, and of other shapes.

Chevron springs in accordance with the present invention have an improved load capability and resistance to fatigue damage as compared with conventional chevron springs. In particular, it has been found that the bending stresses along the apices of the angled metal plates are more evenly distributed and the bending stresses measured in an angled plate for a given compression load are less than for an equally loaded conventional chevron spring.

Having now described the invention, what I claim is:

1. A chevron spring comprising two angled plates of generally V-shaped cross-section and an elastomeric element located therebetween and bonded thereto, wherein in a similarly angled plane disposed between the angled plates and containing the angled elastomeric element the outer profile of the elastomeric element, in at least any regions of the element furthest from the center of the element, is such that the area bounded by the outer profile of the element is less than the product of the length and breadth of each of said bonded faces.

2. A chevron spring according to claim 1, wherein the width of the element in the vicinity of the apex of one of the angled plates is greater than the width of the element at a portion of the element furthest from the apex of said plate.

3. A chevron spring according to claim 1 wherein the elastomeric element is symmetrical about a plane perpendicular to the apex line of one of the V-shaped plates.

4. A chevron spring according to claim 1 wherein the elastomeric element is symmetrical about a plane containing the apex line of one of the V-shaped plates, said plane also bisecting the apex angle of said one of the V-shaped plates.

5. A chevron spring according to claim 4 wherein the outer profile of the elastomeric element is polygonal.

6. A chevron spring according to claim 5 wherein the outer profile comprises at least two perpendicular edges and at least one edge extending therebetween obliquely relative to said perpendicular edges.

7. A chevron spring according to claim 5 wherein the outer profile of the elastomeric element is diamond shaped.

8. A chevron spring according to claim 4 wherein at least part of the outer profile of the elastomeric element is curved.

9. A chevron spring according to claim 8 wherein the outer profile of the elastomeric element is elliptical.

10. A chevron spring according to claim 8 wherein the outer profile of the elastomeric element is circular.

11. A chevron spring according to claim 4 wherein a portion of the outer profile of the elastomeric element is straight and wherein another portion of the outer profile is curved.

12. A chevron spring according to claim 1 wherein a plurality of elastomeric elements are interleaved with and bonded to a plurality of metal plates.

13. A suspension system comprising a chevron spring according to claim 1.

* * * * *